(12) United States Patent
Georgiou

(10) Patent No.: US 10,086,446 B2
(45) Date of Patent: Oct. 2, 2018

(54) ROTARY CUTTING TOOL WITH AN INTERNAL COOLING CAVITY

(71) Applicant: 5ME IP, LLC, Cincinnati, OH (US)

(72) Inventor: George Georgiou, Tecumseh (CA)

(73) Assignee: 5ME IP, LLC, Cincinnati, OH (US)

( * ) Notice: Subject to any disclaimer, the term of this patent is extended or adjusted under 35 U.S.C. 154(b) by 0 days.

(21) Appl. No.: 15/115,725

(22) PCT Filed: Feb. 2, 2015

(86) PCT No.: PCT/US2015/014100
§ 371 (c)(1),
(2) Date: Aug. 1, 2016

(87) PCT Pub. No.: WO2015/117079
PCT Pub. Date: Aug. 6, 2015

(65) Prior Publication Data
US 2017/0173706 A1    Jun. 22, 2017

Related U.S. Application Data

(60) Provisional application No. 61/934,257, filed on Jan. 31, 2014.

(51) Int. Cl.
*B23B 51/06* (2006.01)
*B23Q 11/10* (2006.01)
(52) U.S. Cl.
CPC .......... *B23B 51/06* (2013.01); *B23Q 11/1015* (2013.01); *B23Q 11/1023* (2013.01); *B23Q 11/1053* (2013.01)
(58) Field of Classification Search
CPC .. B23B 51/06; B23Q 11/1015; B23Q 11/1053
See application file for complete search history.

(56) References Cited

U.S. PATENT DOCUMENTS

| 4,440,247 A | 4/1984 | Sartor |
| 2010/0272529 A1 | 10/2010 | Rozzi et al. |

(Continued)

FOREIGN PATENT DOCUMENTS

| CN | 1534229 A | 10/2004 |
| EP | 0757604 A1 | 2/1997 |
| EP | 2554310 A2 | 2/2013 |

OTHER PUBLICATIONS

International Preliminary Report on Patentability for International Patent App. No. PCT/US2015/014100 filed on Feb. 2, 2015, dated Aug. 11, 2016.

(Continued)

*Primary Examiner* — Daniel Howell
*Assistant Examiner* — Paul M Janeski
(74) *Attorney, Agent, or Firm* — Reising Ethington P.C.

(57) ABSTRACT

A rotating cutting tool that is internally cooled by cryogenic fluid has a generally cylindrical outer shape. At least one flute is formed on the cutting tool and a cutting edge is formed on an outer edge of the flute for cutting a workpiece. An internal cold flow delivery path for cryogenic coolant is in proximity to the cutting edge. A coolant cavity is formed in the cutting tool for supplying cryogenic coolant to the internal cold flow delivery path and a return path for cryogenic coolant is downstream from the cold flow delivery path. An exhaust port is coupled to the return path for exhausting cryogenic coolant to atmosphere. The exhaust port is remote from the cutting edge so that the cryogenic coolant is exhausted away from the cutting edge and away from a workpiece so that the cryogenic coolant does not cool and toughen the workpiece.

14 Claims, 4 Drawing Sheets

(56) References Cited

U.S. PATENT DOCUMENTS

2012/0141220 A1 6/2012 Chen
2012/0308319 A1 12/2012 Sampath et al.
2013/0136550 A1 5/2013 Kakai et al.

OTHER PUBLICATIONS

European Search Report and Search Opinion for EP Pat. App. No. 15742656.0 dated Aug. 8, 2017, dated Aug. 22, 2017. 7 pages.
Office Action from the State Intellectual Property Office of the People's Republic of China dated Jun. 21, 2017, for Chinese Patent Application No. 201580006625.1 filed on Feb. 2, 2015.

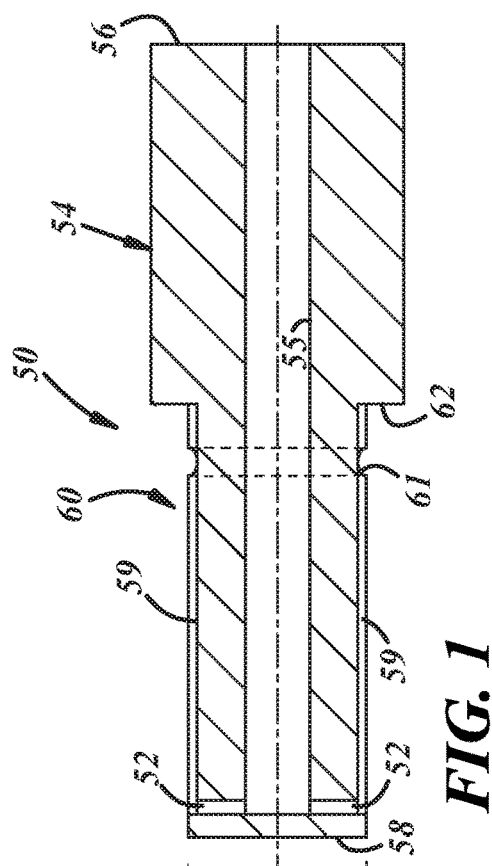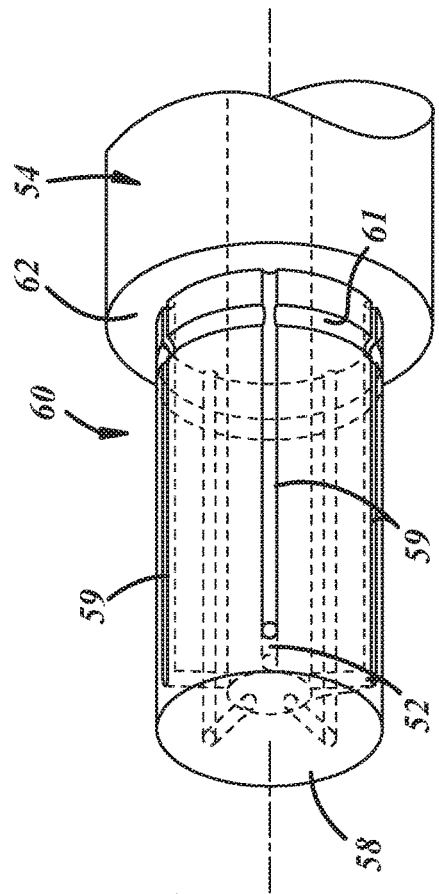
FIG. 1
FIG. 2
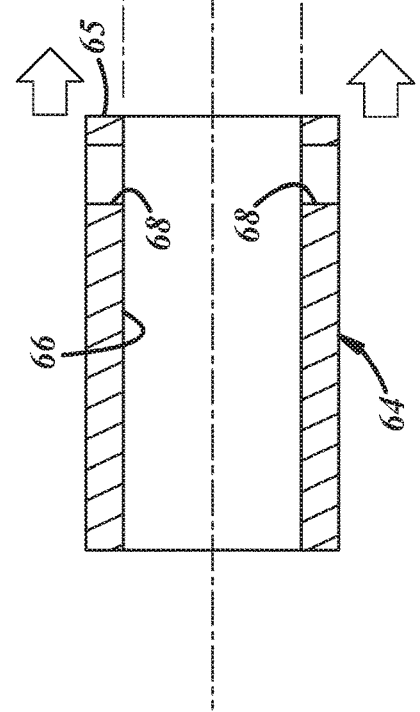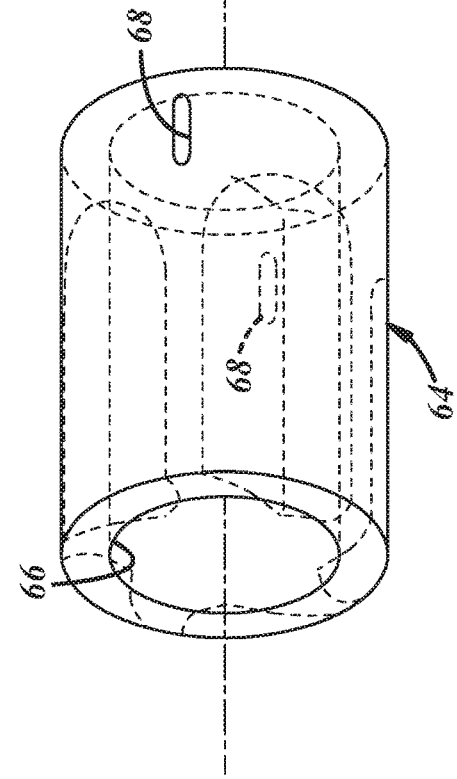

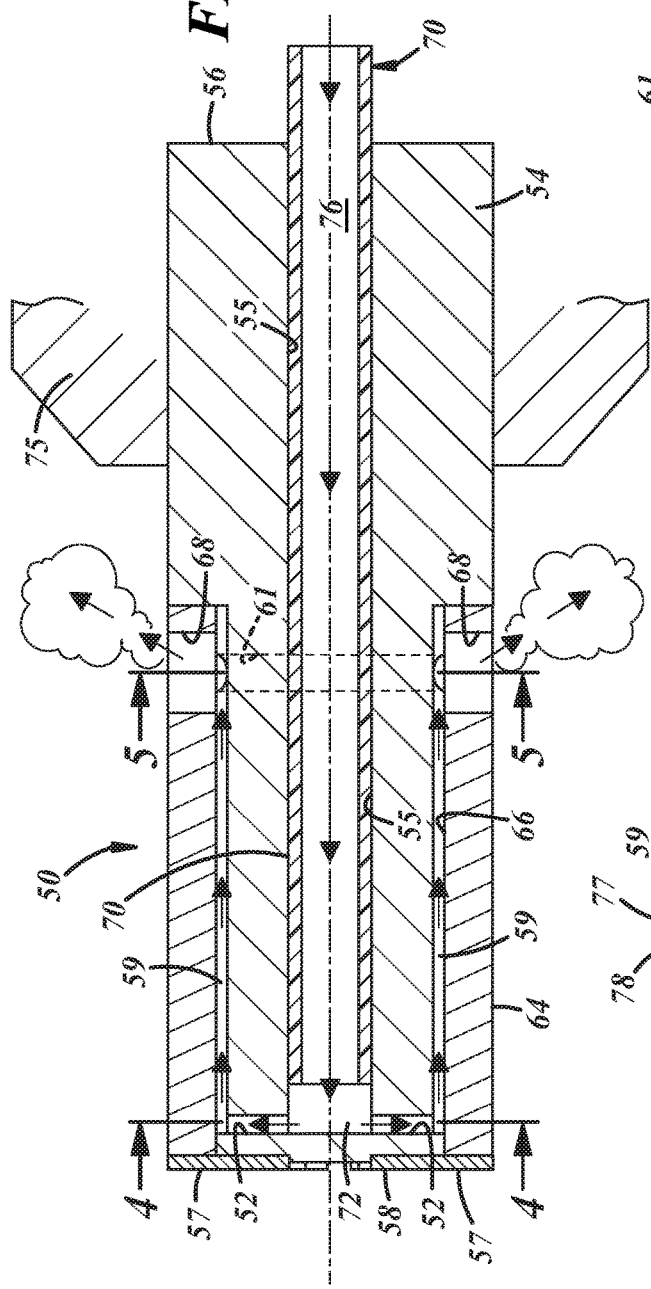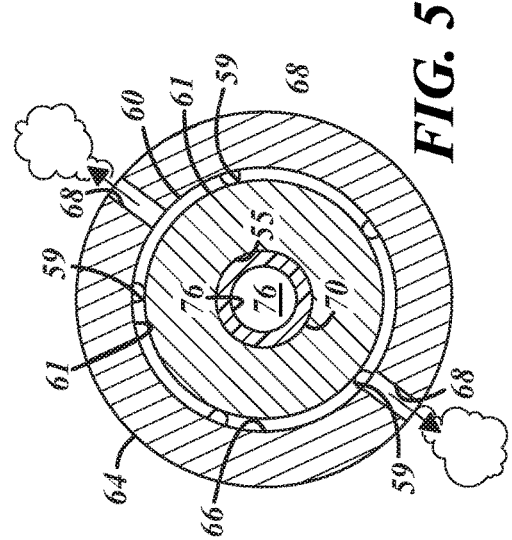

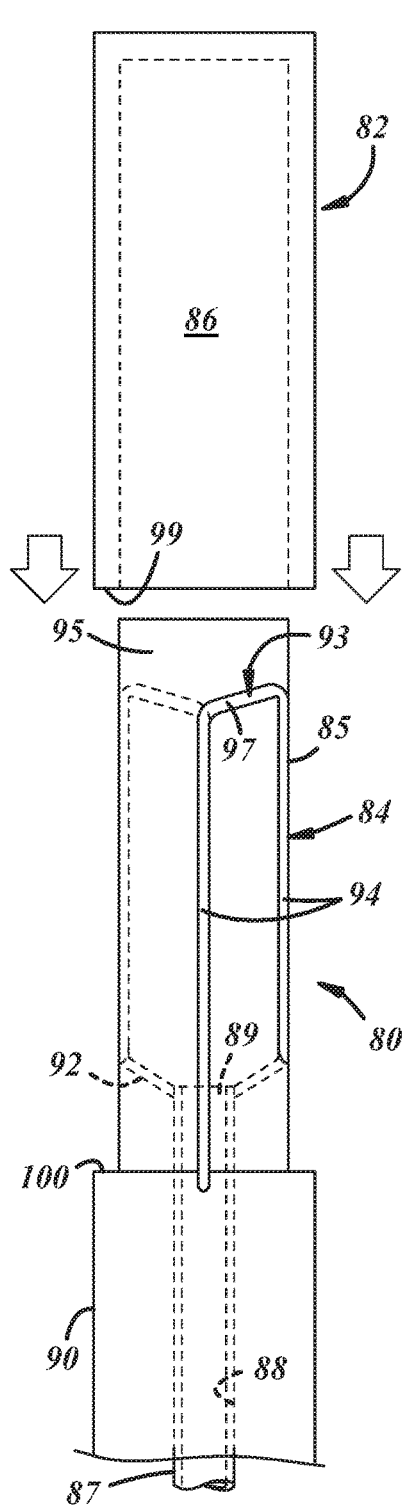
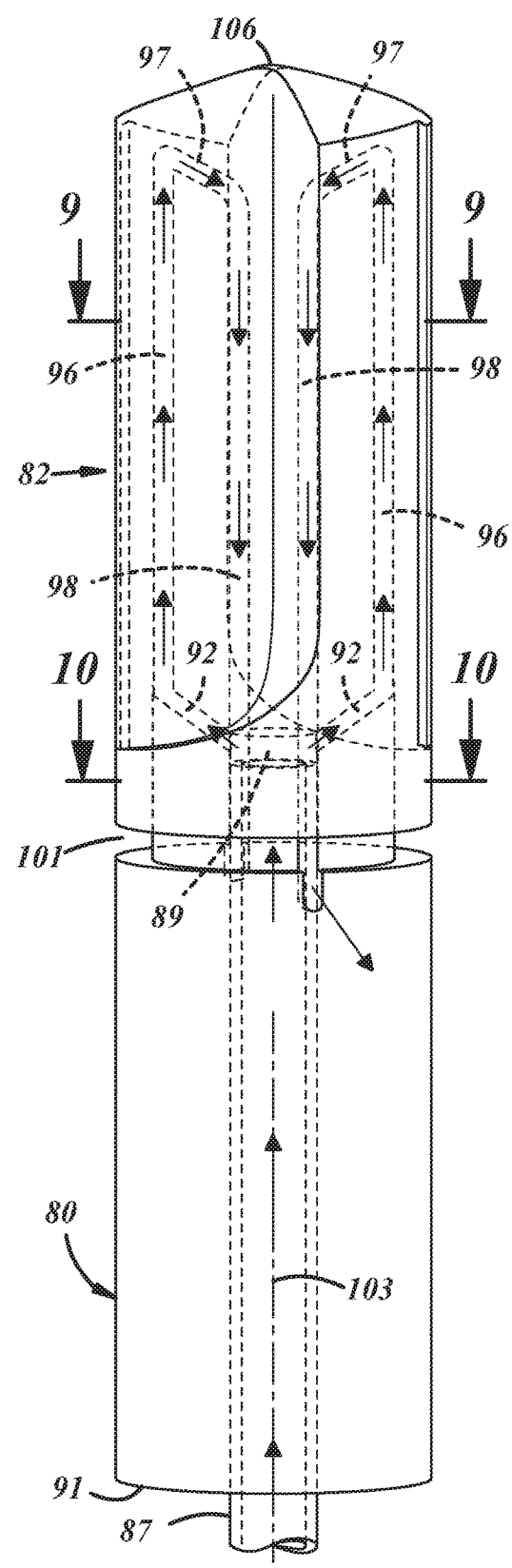
FIG. 6
FIG. 7

ROTARY CUTTING TOOL WITH AN INTERNAL COOLING CAVITY

This application is a § 371 filing of PCT Application PCT/US15/14100 filed on Feb. 2, 2015 and claims the benefit of priority of from U.S. Provisional Patent Application 61/934,257 for a Rotary Cutting Tool With an Internal Cooling Cavity filed on Jan. 31, 2014, the entire disclosures of which are incorporated herein by reference and made a part hereof.

FIELD

The invention relates to a cooling flow path design for cryogenically cooled tools in which the shape of the flow path follows the outer shape of the tool, and the coolant is exhausted from the tool at a location that is remote from the workpiece.

BACKGROUND

Workpiece materials which have a hexagonal lattice structure such as inconel, titanium, cobalt, and the like toughen and become more difficult to machine when a cryogenic fluid is applied to the surface of the material. For this reason, it is advantageous to cool a cutting tool internally when using a cryogenic coolant rather than spray the cryogen coolant on the workpiece when machining such materials.

The increase in cooling on the cutting edge will allow an increase in cutting speed. For example, a 100% increase in cutting speed in titanium material will result in a 30% increase in heat. This means that a 30% reduction in heat at the cutting edge will allow the cutting edge to operate at twice the cutting speed without exceeding the original operating temperature. A tool that is operated at a cutting speed that is twice the original cutting speed can cut the same amount of material in half the time.

BRIEF DESCRIPTION OF THE DRAWINGS

FIG. 1 is an exploded side sectional view of a cutting tool.
FIG. 2 is a perspective view of the core of the cutting tool and a bushing that mounts on the core.
FIG. 3 is a side view showing the assembled cutting tool.
FIG. 4 is a sectional view taken along lines 4-4 of FIG. 3.
FIG. 5 is a sectional view taken along lines 5-5 of FIG. 3.
FIG. 6 is a side view of a drill body and a bushing that mounts on the drill body.
FIG. 7 is a side view of the assembled drill body and bushing of FIG. 6.

DESCRIPTION OF THE PREFERRED EMBODIMENT

Figure 8:
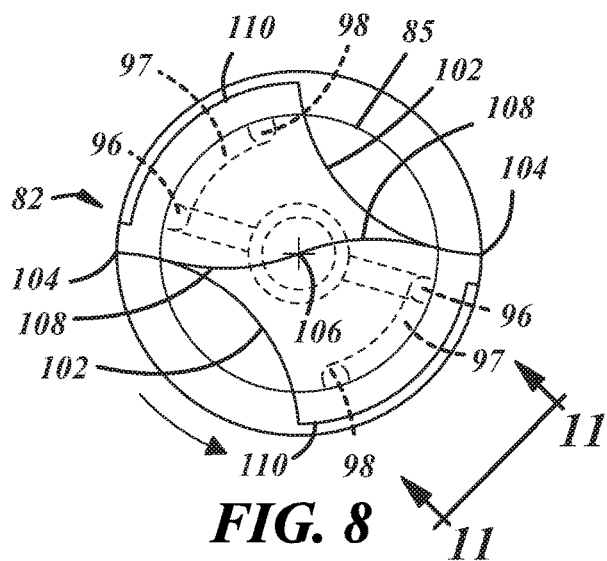
FIG. 8 is an end view of the drill body and bushing of FIG. 7.

FIG. 1 is an exploded side sectional view of a cutting tool 50. The cutting tool 50 comprises a generally cylindrical body 54 having a central blind bore 55 that extends along the longitudinal axis of the cylindrical body 54 from the rear face 56 thereof to a position proximate the front face 58 thereof. Cold flow delivery paths are formed by radial bores 52 that may be formed proximate the front face 58 of the cylindrical body 54 and intersect the central bore 55. The cold flow delivery paths are located so as to be proximate the cutting edges that may be located on the front face 58. Longitudinal grooves 59 may be formed along a front portion 60 of the outer surface of the cylindrical body 54 from the radial bores 52 to a position toward the rear face 56. The longitudinal grooves 59 are downstream from the cold flow delivery path formed by the radial bores 52 and form a return path for cryogenic coolant. The longitudinal grooves 59 may intersect an exhaust manifold groove 61 that is formed around the circumference of the front portion 60. In the embodiment shown, the longitudinal grooves 59 may end at a shoulder portion 62 that is formed on the cylindrical body 54. The shoulder portion 62 has a diameter that is greater than the diameter of the front portion 60 of the cylindrical body 54 on which the longitudinal grooves 59 are formed. A bushing 64 may be inserted over the front portion 60 of the cylindrical body 54 until the rear face 65 of the bushing 64 abuts against the shoulder portion 62. The bushing 64 may have a bore 66 with an internal diameter that allows it to fit tightly over the front portion 60 of the cylindrical body 54. Exhaust ports 68 may be formed on the interior of the bore 66 proximate the rear face 65 of the bushing 64. The length of the bushing 64 may be approximately equal to the length of the front portion 60 of the cutting tool 50. With the bushing 64 in place, the longitudinal grooves 59 form longitudinal passageways that lead from the radial bores 52 in the front portion 60 of the cylindrical body 54 to the exhaust ports 68 formed proximate the rear face 65 of the bushing 64. The cylindrical body 54 and the bushing 64 may be formed from high speed steel, tool steel, carbide, or any other material normally used in the manufacture of cutting tool devices.

FIG. 2 is a perspective view of the front portion 60 of the cylindrical body 54 and the bushing 64. Longitudinal grooves 59 may be formed along the front portion 60 from the radial bores 52 to the shoulder portion 62. The radial bores 52 intersect the longitudinal grooves 59, and the longitudinal grooves intersect the exhaust manifold groove 61.

FIG. 3 is a side view showing an assembled cutting tool 50. A sleeve of insulating material 70 having a through passage 76 may be placed in the central longitudinal blind bore 55. The sleeve of insulating material 70 is positioned in the longitudinal bore 55 to create a front coolant cavity 72 in the blind end of the bore 55, and proximate to the front face 58 of the cutting tool 50. The radial bores 52 couple the coolant cavity 72 to the longitudinal grooves 59. The insulating sleeve 70 may comprise polytetrafluorethylene (PTFE) or other suitable insulating material. The insulating sleeve 70 helps to maintain the cryogenic temperature of the coolant by retarding heat gain by the coolant that is delivered through the sleeve 70 to the front coolant cavity 72. The exhaust ports 68 in the end of the bushing 64 create exit vents at the end of the cutting portion of the tool 50 that lead from the exhaust manifold groove 61 to atmosphere, and direct the coolant away from the workpiece to prevent the coolant from cooling and toughening the workpiece. The cutting tool 50 may be mounted in a tool holder 75 so that the cutting tool 50 can be installed in a spindle in a conventional manner. At least one flute 57 may be formed on the front face 58 of the cutting tool, and as shown in FIG. 4, cutting edges 78 may be formed on the outer edge of the flutes 77.

In order to assemble the cutting tool 50 shown in FIG. 3, the front portion 60 may be machined to form the longitudinal grooves 59, and radial bores 52 may be formed to connect the grooves 59 to the front coolant cavity 72. For clarity, the longitudinal groves 59 are shown to be straight, but it will be understood that spiral grooves will be used if the final cutting tool is provided with spiral cutting edges formed on spiral flutes. The bushing 64 may then be fitted over the front portion 60 of the core. The assembled body 54 and bushing 64 may then be sintered to fuse them together. The front face 58 of the cylindrical body 54 and of the bushing 64 may be machined to form flutes 57, and the outer surface of the bushing 64 may then be machined to form flutes 77. The flutes 57 on the face of the tool may be sharpened and the flutes 77 on the outer cylindrical surface of the tool may be sharpened to provide the cutting edges 78. Alternatively, cutting edges 78 may be brazed or otherwise affixed to the ends of the flutes 57 and 77. The insulating sleeve 70 is then fitted into the blind bore 55 of the body 54. Other methods of assembly may be used.

FIG. 4 is a sectional view taken along lines 4-4 of FIG. 3. The radial bores 52 provide passages from the coolant cavity 72 formed in the end of the blind bore 55 to the longitudinal grooves 59 formed on the front portion 60 of the body. The radial bores 52 are positioned in alignment with and proximate to the flutes 57 that may be formed on the front face 58 of the cutting tool. The longitudinal grooves 59 are positioned in alignment with and proximate to the flutes 77 and the cutting edges 78 that are formed on the outer surface of the bushing 64. The coolant in the radial bores 52 and the longitudinal grooves 59 is effective in removing heat from the cutting edges on the front face 58 of the tool and the cutting edges 78 on the outer circumference of the tool. For simplicity, the flutes 77 in FIGS. 3 and 4 have been shown as being straight, but spiral flutes may also be employed. Because the flutes 77 are shown as being straight, the longitudinal grooves 59 are also shown as being straight, but it will be understood that in cutting tools having spiral flutes, spiral grooves may be employed so that the grooves follow the path of the flutes.

FIG. 5 is a sectional view taken along lines 5-5 of FIG. 3. The longitudinal grooves 59 are positioned near the outermost extremity of the flutes 77, next to the cutting edges 78 formed in the front portion of the tool body. The longitudinal grooves 59 vent back toward the tool holder and spindle and are vented to atmosphere through the exhaust ports 68. The exhaust ports 68 direct the coolant away from the front of the tool and prevent cooling and toughening the workpiece.

In use, a source of coolant is coupled to the rear face 56 of the cutting tool 50 and to the passage 76 that is formed in the sleeve of insulating material 70. The coolant flows from the rear face 56 of the tool 50 to a coolant cavity 72 formed at the end of a blind bore, and from the end of the coolant cavity 72 through the radial bores 52 into the ends of the longitudinal grooves 59 formed on the front part 60 of the tool. The coolant flows along the longitudinal grooves 59 from the front face 58 of the tool toward the rear face 56 until the coolant reaches the exhaust ports 68. The exhaust ports 68 form exit vents to atmosphere for the coolant, and direct the coolant away from the workpiece. The coolant that is used may be a cryogenic coolant such as liquid nitrogen having a temperature of −196° C., or other cryogenic coolants may be used. Non-cryogenic coolants may also be used. The coolant in the radial bores 52 and the longitudinal grooves 59 are much closer to the flutes and the cutting edges 57 on the face 58 of the tool and to the cutting edges 78 along the length of the tool than the coolant in the coolant cavity 72, allowing the cutting edges to operate at a lower temperature.

The flutes 77 in the outer surface of the tool 50 may be right handed, left handed, variable, staggered or straight without departing from the design described herein. In order to maximize the cooling effect of the coolant in the coolant cavity, the internal shape of the coolant cavity and the passageways for the coolant should closely follow the outer shape of the tool. In this way, the distance is minimized between the cutting edges of the tool, which is the heat source, and the coolant in the flutes 77, resulting in maximum heat absorption by the coolant in the cavity.

The device as shown may be applied to boring tools, drills, reamers, endmills, thread mills, taps, and pressed carbide inserts.

The centrifugal force developed by the rotating tool will force the coolant from the coolant cavity 72 to the outermost ends of the radial bores 52, and through the longitudinal grooves 59 to the exhaust ports 68.

FIGS. 6-11 are directed to an embodiment of the device in which the cooling is applied to a cutting tool such as a drill. FIG. 6 is a side view of a drill body 80 and a bushing 82 that fits on the forward end 84 of the drill body 80 in order to produce a drill as explained more fully below. The forward end 84 of the drill body 80 has a reduced diameter portion 85 in order to fit into a blind bore 86 formed in the bushing 82. The blind bore 86 in the bushing 82 is dimensioned to be a tight fit over the reduced diameter portion 85 of the drill body 80. The drill body 80 has an axial blind bore 88 in the shank end 90 which extends from the end 91 of the drill body 80 as shown in FIG. 7 to the reduced diameter portion 85 at the forward end 84 of the body. Cross-drilled holes 92 are formed in the reduced diameter portion 85 from the outer surface of the reduced diameter portion 85 to a coolant cavity 89 formed at the end of the blind bore 88 in the drill body as explained more fully below. Grooves 94 may be formed along a portion of the length of the reduced diameter portion 85 to provide a path for coolant in the finished drill as explained more fully below. The grooves 94 may extend along a U-shaped path 93 from the cross-drilled holes 92 at the beginning of the cutting portion of the tool 80 to the tip 95 of the reduced diameter portion 85 and back toward the end of the cutting portion of the tool. Each U-shaped path 93 may comprise a cold flow delivery path 96, a cross-over portion 97, and a return path 98. Each cold flow delivery path 96 may communicate with a cross-drilled hole 92, and each return path 98 may communicate with an exhaust gap 101 formed between the end 99 of the bushing 82 and the shoulder 100 formed on the shank end 90 of the drill body 80.

Figure 9:
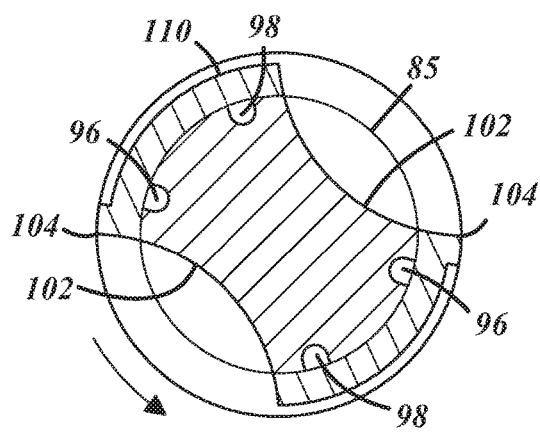
FIG. 9 is a sectional view taken along line 9-9 of FIG. 7.
Figure 10:
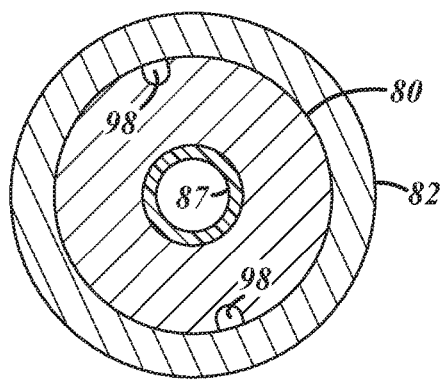
FIG. 10 is a sectional view taken along line 10-10 of FIG. 7.
Figure 11:
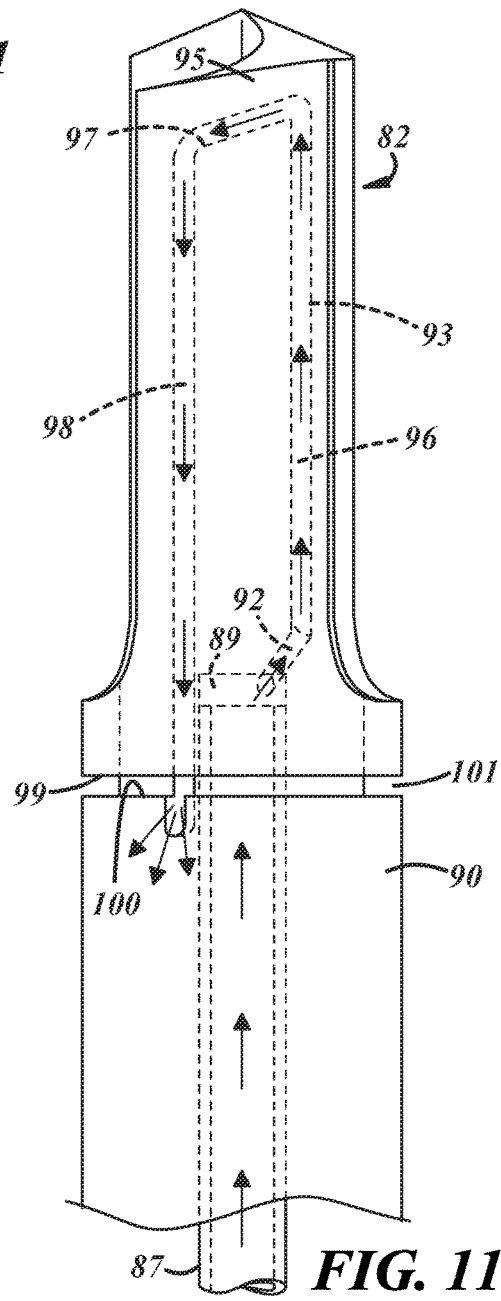
FIG. 11 is a perspective view of an assembled drill body and bushing taken along line 11-11 of FIG. 8.

FIGS. 7 and 11 are side views of an assembled drill body 80 and bushing 82. A sleeve 87 of insulating material such as PTFE may be inserted into the blind bore 88 in order to insulate the cryogenic coolant from heat gain from the drill body 80. A coolant cavity 89 may be formed between the end of the sleeve 87 and the end of a blind bore 88 in the middle of the cutting tool, and the cross drilled holes 92 may intersect the coolant cavity 89. The outer surface of the bushing 82 may be machined to form drill flutes 102 as best seen in FIGS. 8 and 9, and the flutes 102 may be sharpened to form cutting edges 104. The cold flow delivery paths 96 extend along the axis 103 of the tool from the coolant cavity 89 to the tip 106 of the tool. The cross-over flow paths 97 are located at the tip 106 of the tool, and the return path 98 extends from the tip 106 of the tool to the shank end 90 of the tool.

FIG. 8 is an end view of the drill body 80 and bushing 82 of FIG. 7. The bushing 82 may be machined to form two flutes 102 along the length of the bushing, but other numbers of flutes may be formed on the bushing 82 as desired. A pointed tip 106 having cutting edges 108 is formed by the merger of the two flutes 102, and in operation, the cutting edges 108 surrounding the pointed tip 106 remove the greatest amount of material in a hole drilling operation. As a result, the cutting edges 108 and the pointed tip 106 become hotter during a cutting operation than the other portions of the drill, and consequently this portion of the drill benefits the most from cooling. The cold flow delivery path 96 is positioned to be in proximity to the cutting edge 104 of the flute 102 on the outer circumference of the cutting tool, and the return path 98 is adjacent to the trailing lip 110 of the flute. The cross-over portion 97 of each U-shaped path 93 connects the cold flow delivery path 96 to the return path 98, and is proximate to a cutting edge 108 of the pointed tip 106. The bushing 82 may be machined to form more than two flutes as well known in the art.

In order to produce the assembled drill of FIGS. 7-11, the bushing 82 is first fit onto the reduced diameter portion 85 of the body portion 80 of the drill. The bushing 82 and the reduced body portion 85 are then sintered to fuse them together. The flutes 102 are then formed on the bushing 82 and the flutes are finish ground in order to form the sharpened edges 104 of the flutes. The flutes 102 are formed on the outer surface of the bushing 82 so that the sharpened edges 104 of the flutes are adjacent to the cold flow delivery paths 96 formed on the reduced diameter portion 85 of the drill body 80, and the cutting edges 108 of the pointed tip 106. The sleeve 87 of insulating material is then inserted into the blind bore in the body portion 80.

In use, coolant enters the drill body 80 through the insulating sleeve 87 and collects in the coolant cavity 89 formed between the end of the insulating sleeve 87 and the end of the blind bore 88. The coolant in the coolant cavity 89 flows through the cross-drilled holes 92 to the cold flow delivery path 96, and from the cold flow delivery path 96 through the cross-over portion 97 to the return path 98, and from the return path 98 to the exhaust manifold groove 101 and to the exhaust ports 99 and to atmosphere. The cold flow delivery path 96 positions the coolant as close as possible to the sharpened flutes 104 of the drill and the cross-over portion 97 positions the coolant as close as possible to the cutting edges 108 at the tip of the drill to maximize the heat removed by the coolant from these areas of the drill. The return path 98 directs the coolant to the exhaust gap 101 that is located at the end of the cutting portion of the tool remote from the tip 106 of the drill so that the coolant can be exhausted to atmosphere and directed away from the workpiece. This prevents the cryogenic coolant from impinging on and toughening the workpiece. The coolant that is used may be a cryogenic coolant such as liquid nitrogen having a temperature of −196° C., or other cryogenic coolants may be used. Non-cryogenic coolants may also be used.

Figure 12:
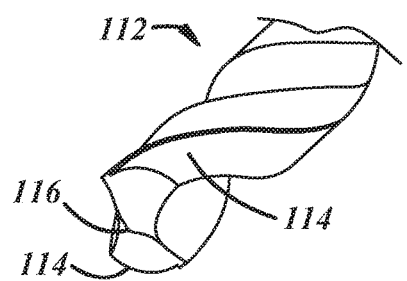
FIG. 12 is a perspective view of a drill having twisted flutes.

FIG. 12 is a perspective view of a drill 112 having flutes that are twisted. The drill 112 that is shown has two flutes 114 that are twisted to form a spiral. The flutes 114 terminate in a pointed tip 116. The construction shown and described in connection with FIGS. 6-11 may be applied to the drill having two twisted flutes as shown in FIG. 12. A drill having flutes that are twisted may also be made with more than two flutes as will be understood by those skilled in the art.

Having thus described the device, various modifications and alterations will occur to those skilled in the art, which modifications and alterations will be within the scope of the device as defined by the appended claims.

What is claimed is:

1. A rotating cutting tool that is internally cooled by cryogenic coolant, the rotating cutting tool comprising:
a tool body having a generally cylindrical outer shape and an outer circumference;
a plurality of flutes formed on the front part of the cutting tool, a cutting edge formed on each of the plurality of flutes for cutting a workpiece, and a cold flow delivery path for each of the cutting edges;
an internal cold flow delivery path for cryogenic coolant in the cutting tool, said cold flow delivery path being in proximity to the cutting edge on the at least one flute;
an internal coolant cavity formed in the cutting tool for supplying cryogenic coolant to the internal cold flow delivery path is positioned at the front of the cutting tool and the cold flow delivery path is in proximity to cutting edges that are formed on the front part of the cutting tool;
an internal bore extending from an end of the tool body that is opposite the front part of the cutting tool, said internal bore supplying cryogenic coolant to the internal coolant cavity;
an insulating sleeve mounted in a blind bore in the cutting tool body, wherein the insulating sleeve prevents heat gain by the cryogenic coolant that flows into the cutting tool body, and wherein the coolant cavity is located between an end of the insulating sleeve and an end of the blind bore;
an internal return path for cryogenic coolant that is downstream from the internal cold flow delivery path, wherein said internal bore, the internal coolant cavity, the internal cold flow delivery path, and the internal return path are all connected together and are all internal to the rotating cutting tool, whereby the cryogenic coolant remains internal to the cutting tool in an internal continuous flow path, and is prevented from contacting the workpiece along the internal continuous flow path through the cutting tool; and,
an exhaust port coupled to the internal return path for exhausting cryogenic coolant to atmosphere, the exhaust port being remote from the cutting edge, whereby the cryogenic coolant is exhausted away from the cutting edge and away from a workpiece engaged by the cutting edge so that the cryogenic coolant does not cool the workpiece.

2. The rotating cutting tool of claim 1 wherein the internal return path is proximate to the cutting edges formed on the outer circumference of the cutting tool.

3. The rotating cutting tool of claim 2 further comprising:
an internal return path for each of the cold flow delivery paths.

4. The rotating cutting tool of claim 3 wherein the rotating cutting tool is an endmill.

5. The rotating cutting tool of claim 3 wherein the rotating cutting tool is a reamer.

6. The rotating cutting tool of claim 3 wherein the cryogenic coolant is liquid nitrogen having a temperature of −196° C.

7. The rotating cutting tool of claim 1 wherein the coolant cavity is positioned in the middle of the cutting tool and the cold flow delivery path is in proximity to cutting edges that are formed on the outer circumference of the cutting tool.

8. The rotating cutting tool of claim 7 further comprising:
an internal cross-over flow path coupling the cold flow delivery path to the internal return path, the internal cross-over flow path being in proximity to cutting edges formed on a tip of the rotating cutting tool.

9. The rotating cutting tool of claim 8 wherein the cold flow delivery path extends along the axis of the tool from the coolant cavity to the tip of the tool, the internal cross-over flow path is located at the tip of the tool, and the internal return path extends from the tip of the tool to the end of the cutting portion of the tool.

10. The rotating cutting tool of claim 9 further comprising:
   an exhaust port coupled to the internal return path, the exhaust port being located at the end of a cutting portion of the tool, whereby the cryogenic coolant is exhausted away from the cutting edge and away from a workpiece engaged by the cutting edge so that the cryogenic coolant does not cool the workpiece.

11. The rotating cutting tool of claim 10 wherein the cryogenic coolant is liquid nitrogen having a temperature of −196° C.

12. The rotating cutting tool of claim 10 further comprising:
   an insulating sleeve mounted in a blind bore in the cutting tool body, wherein the insulating sleeve prevents heat gain by the cryogenic coolant that flows into the cutting tool body, and wherein the coolant cavity is located between an end of the insulating sleeve and an end of the blind bore.

13. The rotating cutting tool of claim 12, wherein the cutting tool is a drill.

14. The rotating cutting tool of claim 13, wherein the cutting tool has twisted flutes.

\* \* \* \* \*